United States Patent [19]

Waugh et al.

[11] 4,372,147

[45] Feb. 8, 1983

[54] FLOW METER PROVER APPARATUS AND METHOD

[75] Inventors: Charles C. Waugh, Tarzana; Robert L. Wehrli, Malibu, both of Calif.

[73] Assignee: Waugh Controls Corporation, Chatsworth, Calif.

[21] Appl. No.: 244,790

[22] Filed: Mar. 17, 1981

[51] Int. Cl.³ .......................................... G01F 25/00
[52] U.S. Cl. ................................................... 73/3
[58] Field of Search ............................................ 73/3

[56] References Cited

U.S. PATENT DOCUMENTS

| | | | |
|---|---|---|---|
| 3,273,375 | 9/1966 | Howe | 73/3 |
| 3,492,856 | 2/1970 | Francisco | 73/3 |
| 3,777,545 | 12/1973 | Grove | 73/3 |
| 4,152,922 | 5/1979 | Francisco | 73/3 |

FOREIGN PATENT DOCUMENTS 1420754  1/1976  United Kingdom ...................... 73/3

*Primary Examiner*—S. Clement Swisher
*Attorney, Agent, or Firm*—Reagin & King

[57] ABSTRACT

A flow meter prover is disclosed which includes an outer fluid housing having an inlet and an outlet, a measuring conduit coaxially mounted within the outer housing and having first and second sets of fluid apertures adjacent, respectively, the upstream and downstream ends thereof, a fluid barrier mounted within the annular cavity between the outer housing and the conduit, a controllable piston mounted within the conduit, an actuating rod axially projecting from the downstream side of the piston where the free end of the rod extends through the downstream end of the outer housing, a bypass valve connected between the inlet and outlet of the outer housing, and first and second piston detection switches spaced apart along the length of the measuring conduit. There are provisions for automatically correcting for variations in the dimensions of the measuring conduit due to variations in fluid temperature. The prover also includes apparatus for continuously monitoring the integrity of the piston seals, and may be operated with equal fluid pressure on both sides of the piston.

16 Claims, 8 Drawing Figures

FLOW METER PROVER APPARATUS AND METHOD

BACKGROUND OF THE INVENTION

This invention relates to flow meter provers, and more particularly to an in-line flow meter prover having increased reliability and accuracy and which may be constructed and operated with a minimum of complexity.

In the use of flow meters to measure the quantity of fluid flowing in a conduit, it frequently is desirable to determine the accuracy of the meter while it is in service, without disrupting the flow of the fluid being measured. A number of devices have been developed and are in use for such purpose, and are known as in-line meter provers.

Provers of the class to which this invention relates operate by causing the fluid stream to pass simultaneously through the meter and through a conduit containing a movable fluid barrier, typically a ball which fits snugly into the conduit or a piston having a similar fit. The barrier device is launched into the fluid stream at an upstream position and travels with the fluid, passing two detection points, and stopping at a downstream position. The barrier is then returned by various means to the upstream position, from which it may be launched again for a following test. The two detection points are normally represented by electrical switches which are actuated by passage of the barrier. A comparison of the volume of the prover in the space between the two detection points with the measurement by the meter of the same volume of fluid serves to determine the meter accuracy.

The type of flow meter to which this class of provers is best applied is one designed to produce a series of electrical impulses, each impulse representing a certain volume of fluid. Flow quantity as measured by the meter is determined by counting the total number of impulses produced as the fluid passes through the meter. Such counting is readily performed by electronic counters which display a number representing the total number of impulses received from the meter.

The purpose of proving is to calibrate the meter so that the quantity of fluid represented by each impulse is precisely known. Additionally, a precise measurement of rate of flow, i.e., volume per unit of time, may be obtained from the prover by dividing the volume between detection points by the time elapsed during the passage of the barrier between the same points. This method of measuring flow rate enables the prover to also be used to calibrate flow meters having an analog output which is a function of flow rate.

With a flow meter designed to produce impulses, proving is performed by connecting the flow meter impulses to a prover counter which is an electronic counter having gating circuits activated by the detector switches in the prover. The gating circuits cut off the incoming impulses until the first detector switch is actuated. The counter then starts and continues counting until the second switch is activated, whereupon the counting is terminated.

The volume of fluid displaced between the two switches is a known volume, having been precisely measured either by a displacement test or by direct measurement of the conduit diameter and the linear distance between the detection points. In the displacement test, which is performed with the prover removed from the flowing stream the volume displaced between the detection points is determined by filling the prover with fluid, causing the barrier to move slowly through the conduit, collecting the displaced fluid in a graduated container, and noting the level in the container at each detection point.

Following a proving test, a numerical factor defining the number of meter impulses per unit of fluid volume is determined by dividing the number of impulses produced during the proving test by the prover volume. This factor is known as a calibration factor, or K factor, and is expressed in terms of impulses per unit volume.

It has been found that the designs employed in the construction of prior art provers may cause measurement errors which limit the accuracy and repeatability achievable with these devices. For example, in prior art provers the displaced volume of the prover will change as the pressure of the fluid causes slight but significant changes in the diameter of the prover conduit. Similarly, conduit dimensions, and hence volume, will change as the temperature of the fluid causes the conduit to expand or contract.

It is commonly accepted practice to calculate a compensation factor to correct for prover volume changes due to the effect of temperature and pressure on the conduit material. For example, in a typical procedure the temperature and pressure of the fluid in the conduit are measured during the proving run. Changes in the dimensions of the conduit relative to a standard temperature and pressure are then calculated, from which a corrected volume is computed.

Several assumptions are made in the above procedure which may result in errors. First, it is assumed that the temperature of the conduit is the same as the temperature of the fluid, which is not the case if there is a difference in temperature between the fluid within the conduit and the ambient air outside the conduit. Further, a standard elastic modulus is assumed for the conduit whereas the modulus actually varies due to variations in the composition of the material from which the conduit is fabricated. Still further, the effects on prover volume due to flanges or other stiffening members at the ends of the conduit are difficult to analyze, and are therefore generally ignored. Finally, the use of compensation calculations is somewhat tedious, presenting opportunities for an operator to make mathematical errors.

Howe U.S. Pat. No. 3,273,375, issued Sept. 20, 1966, discloses calibrating apparatus utilizing a double wall construction in which the measuring conduit is enclosed in an outer housing. An object of this type of construction is to reduce fluid pressure stress on the conduit. Howe shows the measuring conduit supported by a plurality of ribs spaced apart along the length of the measuring conduit and structurally connecting the conduit to the outer housing.

In a conduit that is totally surrounded by fluid, stresses on the conduit imposed by the fluid pressure are virtually eliminated. In the Howe apparatus, however, large pressure differentials exist in the area of the supporting ribs which can cause conduit dimensional distortions. Accordingly, placement of conduit supporting structure adjacent the measuring portion of the conduit contributes to measurement errors as a result of fluid pressure imbalance.

Totally surrounding a conduit with fluid also has the effect of equalizing the temperature of the conduit to the temperature of the fluid. However, in the Howe apparatus described above, the measuring fluid is precluded from contact with the outside surface of the conduit in the area of the supporting ribs. Further, the ribs act to transfer heat from the conduit to the outer housing. These conditions cause temperature gradients which result in conduit dimensional distortions and attendant measurement errors.

In existing provers the launching and return of the fluid barrier device involves many difficult mechanical problems which are not readily overcome. Mechanisms tend to be complex and the prover itself is bulky and costly to construct. Some provers utilize complex reversing valves to reverse the direction of the flow in the conduit and thereby return the barrier to its original position. Other designs utilize devices to retract the barrier and restrain it in the upstream position, as well as to bypass the flow through the piston by means of a poppet valve when the prover is not being used in a proving test. Provers utilizing valves to reverse the direction of the flow are known as bidirectional provers because proving tests may be made with the barrier traveling in either direction. Provers utilizing devices to retract and restrain the barrier are known as unidirectional provers because the fluid and the barrier always travel in the same direction in the conduit.

In the above described designs, there is an interval of time during the operation of either the reversing valve or the poppet valve when a portion of the fluid stream bypasses the barrier. Since the barrier must move with the entire stream during the actual proving of the meter, an additional length of conduit is normally provided upstream of the first detection point to allow the valve to seat properly and to shut off all bypass flow, thus assuring that the barrier is traveling with the full stream flow when its reaches the first detection point.

The Howe invention mentioned above is a bidirectional prover employing a conduit, a free piston as a fluid barrier, and a four-port valve to reverse the direction of fluid flow. Since no means are provided for restraining piston movement during the operation of the valve, a sufficient length of conduit is provided at both the upstream and downstream ends to assure that the valve is closed and that the piston is traveling with the full stream flow before reaching the detection points. From the foregoing discussion it can also be seen that the speed of operation of the valve is a critical factor in the operation of the Howe apparatus. If the value does not close quickly enough, a portion of the stream will bypass the piston.

Francisco U.S. Pat. No. 3,492,856, issued Feb. 3, 1970, discloses unidirectional flowmeter calibrating apparatus employing a piston within a conduit, where the piston is restrained in the upstream position by means of a complex motor, clutch and cable assembly located upstream of the conduit. A poppet valve, held open by the cable, provides a fluid passage through the piston when the apparatus is not being used for flow measurements. Releasing the cable sets the piston in motion and permits fluid pressure to close the poppet valve. Because the valve operation and the piston restraint are controlled by the same element, namely the cable, there are no means for restraining piston movement during the operation of the valve. Consequently, as in the case of Howe, additional conduit length must be provided to assure that the piston is traveling at full speed before reaching the first detection point. The response time of the poppet valve is also a critical factor in the operation of this apparatus.

Francisco U.S. Pat. No. 4,152,922, issued May 8, 1979, also discloses unidirectional flowmeter calibrating apparatus employing a measuring piston within a measuring cylinder. The piston is restrained in the upstream position by means of a second, retracting, piston mounted within a retracting cylinder located on the upstream side of the measuring cylinder. The retracting piston is connected to the upstream side of the measuring piston. As in the earlier referenced Francisco apparatus, a poppet valve is provided within the measuring piston to form a fluid passage through the measuring piston when the apparatus is not being used for flow measurements. In the upstream position the retractng piston of the latter Francisco apparatus serves the dual function of restraining the measuring piston and holding the poppet valve open. Releasing the retracting piston sets the measuring piston in motion and permits fluid pressure to close the poppet valve. For the reasons stated above, this configuration suffers from the same limitations as the earlier cited references, namely the requirement for additional conduit length, and the critical nature of the poppet valve response time.

Another problem associated with provers which employ movable fluid barriers is caused by the friction developed by the seal between the barrier and the conduit. For example, to reduce the chances of leakage past the movable piston, prior art provers employ seal rings between the piston and the conduit. Friction created by the seals must be overcome to move the piston. As described below the solution to this friction problem is further complicated by the fact that it is desirable to have equal fluid pressure on both the upstream and downstream sides of the piston to avoid affecting the flow rate of the measured fluid. Equal fluid pressure across the piston has the added advantage of preventing leakage around the piston seals.

In those prior art provers employing free pistons, such as the Howe apparatus referenced above, both the upstream and downstream sides of the piston present the same surface area to the fluid pressure. Thus, in this configuration equal fluid pressure on both sides of the piston provides no net force to overcome seal friction. The result is that the free piston will not move until the upstream pressure is greater than the downstream pressure. The magnitude of the friction may readily cause a change in the rate of flow through the prover, introducing an undesirable effect in the total fluid system. This effect of seal friction is especially undesirable where the measured fluid is compressible, because an actual change in fluid volume can occur, causing measurement errors.

The apparatus disclosed in the Francisco U.S. Pat. No. 3,492,856 discussed above suffers a similar problem. In fact, this problem is aggravated by the inclusion of a cable assembly attached to the upstream side of the piston. The cable and its drum assembly cause additional drag on the downstream motion of the piston, requiring an even larger pressure imbalance across the piston to overcome both seal friction and cable drag.

In the apparatus disclosed in the Francisco U.S. Pat. No. 4,152,922 discussed above, a rod is connected between the upstream side of the measuring piston and the retracting piston. The area of the rod reduces the effective surface area, and thus the force of the fluid, on the upstream side of the measuring piston, requiring even greater upstream pressure to move the piston. The motion of the measuring piston is further retarded by the friction caused by the seals of the retracting piston. In an attempt to overcome these retarding forces on the measuring piston, the Francisco apparatus must apply pressure to the upstream side of the retracting piston to aid the downstream motion of the measuring piston during a prover test. Further, Francisco teaches that it is desirable to further increase the pressure on the retracting piston beyond that necessary to overcome system drag forces in order to maintain a higher pressure on the downstream side of the measuring piston then on the upstream side thereof. The necessity for this increased pressure is to ensure that the poppet valve employed in the Francisco apparatus remains closed and sealed. Thus the Francisco apparatus requires unequal pressure across the measuring piston for its operation, with the above described undesirable effects. Further, with high fluid pressure in the measuring conduit, the piston rod is subjected to high compression loads which can result in the rod failing as a column.

The Francisco U.S. Pat. No. 4,152,922 also discloses a modification to the apparatus described above in which the retracting rod extends completely through the cylinder from end to end. The object is to reduce the force unbalance created by the area of a rod which is located solely on the upstream side of the measuring piston. Evan with this modification, which requires an additional seal further increasing piston drag force, the Francisco apparatus still requires unbalanced piston pressure to overcome all of the drag forces enumerated above, and to ensure poppet valve closure.

In summary, prior art provers do not operate with equal fluid pressure on both sides of the measuring piston, resulting in flow rate changes and attendant measuring errors.

Means must also be included in fluid barrier type provers for stopping the barrier at the end of its travel. Prior art provers employ mechanical stops which result in an abrupt change in piston motion. For example the Howe apparatus employs rods projecting from the center of both ends of the outer housing to prevent the piston from exiting the conduit. The rods are designed to directly contact the sides of the piston, causing an abrupt stop. The Francisco U.S. Pat. No. 3,492,256 discloses a portion of the poppet valve associated with the piston assembly which is designed to directly contact the downstream end of the cylinder to operate the poppet valve. Apparatus disclosed in both Francisco references employ direct contact between the piston and the upstream end of the cylinder housing to stop the piston motion on the return stroke.

The abrupt changes caused by the stopping mechanisms of the prior art provers tend to produce undesirable perturbations in the fluid system. They also produce high shock loads in the various mechanical components of the system.

As described above, a variety of techniques are employed in prior art unidirectional provers to return the fluid barrier to the upstream position after a prover test. The Francisco apparatus disclosed in U.S. Pat. No. 3,492,856 employs a cable and motor to retract the piston, while in the Francisco apparatus disclosed in U.S. Pat. No. 4,152,922, pressure is applied to the downstream side of the retracting piston, forcing the measuring piston to its upstream position. This latter prover configuration requires means for pressurizing the upstream side of the retracting piston to assist the motion of the measuring piston during a test, as well as means for pressurizing the downstream side of the retracting piston to return the measuring piston to its upstream position after a test. The retracting piston and cylinder arrangement of Francisco is thus complex, requiring high pressure piston seals and a plurality of valves and regulators for proper operation.

Achieving accurate and repeatable measurements with fluid barrier type provers requires that during the proving test there be no fluid leakage past the barrier seals or past any bypass valve mechanisms. In U.S. Pat. No. 4,152,922, Francisco discloses methods of testing for seal leakage which require either shutting off fluid flow to the entire system, or removing the prover from the system and performing a separate bench test. In either case the flow of the fluid being measured is disrupted and consequently these leak test methods cannot be performed while the prover is in operation. Thus, there is no way of assuring the integrity of the seals during an actual proving test.

It is accordingly an object of the present invention to provide a new and improved flow meter prover which requires no external conpensation for pressure or temperature changes;

It is yet another object of the present invention to provide a new and improved flow meter prover which may be operated with equal fluid pressure on both sides of the fluid barrier;

It is yet another object of the present invention to provide a new and improved flow meter prover in which the integrity of the seals affecting prover accuracy are continuously monitored while the prover is functioning.

SUMMARY OF THE INVENTION

The foregoing and other objects of the invention are accomplished by a flow meter prover in which the fluid stream passes simultaneously through a cylindrical conduit containing a movable fluid barrier in the form of a piston, and through the flow meter under test. The prover utilizes a double wall construction in which an inner measuring conduit is enclosed in an outer housing in a manner which permits the measuring portion of the conduit to be entirely surrounded by the measured fluid. Thus, there are virtually no fluid pressure induced stresses imposed upon the measuring portion of the conduit; and compensation for changes in prover volume due to fluid pressure is not required.

The above described double wall construction also assures that the entire measuring portion of the conduit is at the same temperature as the fluid, thus eliminating compensation errors due to heat transfer through the outer housing. This arrangement enables the implementation of automatic temperature compensation. This compensation is accomplished by automatically varying the positions of the two detector switches used to sense the position of the piston in the conduit. The detector switches are mounted on bimetal elements which are arranged to sense the temperature of the measured fluid. These bimetal elements vary the position of the detector switches in response to fluid temperature changes in an amount which exactly compensates for changes in the conduit dimensions due to temperature.

In the operation of the prover the piston travels downstream in the cylindrical conduit in synchronism with the fluid flow, and is returned to its original upstream position by means of an actuating rod attached to the downstream side of the piston. During the return stroke a bypass valve external to the housing allows the flow to continue without interruption. Upstream and downstream ports are provided in the conduit to allow the flow to bypass the piston while it is at rest in both the upstream and downstream positions. These ports permit the flow to continue around the piston while the bypass valve is in the process of closing (when the piston is in the upstream position) and opening (when the piston is in the downstream position).

Prior to a proving test, the piston is held in the upstream position by applying pressure to the rod. The bypass valve is then closed. After the valve has fully sealed, pressure against the rod is released, allowing the piston to move downstream. As soon as the piston covers the conduit upstream ports, it is accelerated to full fluid velocity within a very short distance, approximately the diameter of the ports. At the downstream end of the conduit, the fluid is bypassed immediately after the piston passes a first set of downstream ports at which time the bypass valve is opened. A second set of downstream ports is also provided which has the effect of smoothly decelerating the piston to a stop without any abrupt mechanical shock.

By separating the flow bypass function, namely the bypass valve and conduit ports, from the piston restraining function, namely the rod, fluid equilibrium may be established in both the prover and the flow meter prior to releasing the piston and starting the test. This design permits nearly all of the conduit length to be utilized for the actual proving function with only a short section required at either end of the conduit for accelerating and decelerating the piston. In addition, the response time of the bypass valve is not a factor in the operation of the prover.

The placement of the restraining rod on the downstream side of the piston reduces the effective downstream surface area of the piston. The result is that with equal fluid pressure on both sides of the piston, there is a net force aiding the downstream motion of the piston and overcoming piston seal friction. Returning the piston to the upstream side of the conduit simply requires the application of pressure to the end of the rod, eliminating the need for a retracting piston.

The prover also includes means for continuously monitoring the integrity of both the bypass valve seals and the piston seals while the prover is functioning. The bypass valve is of the double-back-and-bleed type which incorporates a seal on each side of an intervening cavity. Pressure in this cavity is monitored during the proving run to assure that there is no leakage past either seal and, hence, no leakage through the valve. Similarly, the piston also incorporates a double seal and an intervening cavity which is connected by means of a flexible tube through a port at one end of the prover housing. Pressure between the piston seals can thus be monitored during the proving run to ensure that there is no leakage past either piston seal and hence no leakage past the piston.

These and other objects, features, and advantages of the invention will become apparent from a reading of the specification when taken in conjunction with the drawings in which like reference numerals refer to like elements in the several figures.

DESCRIPTION OF THE PREFERRED EMBODIMENT

Figure 1:
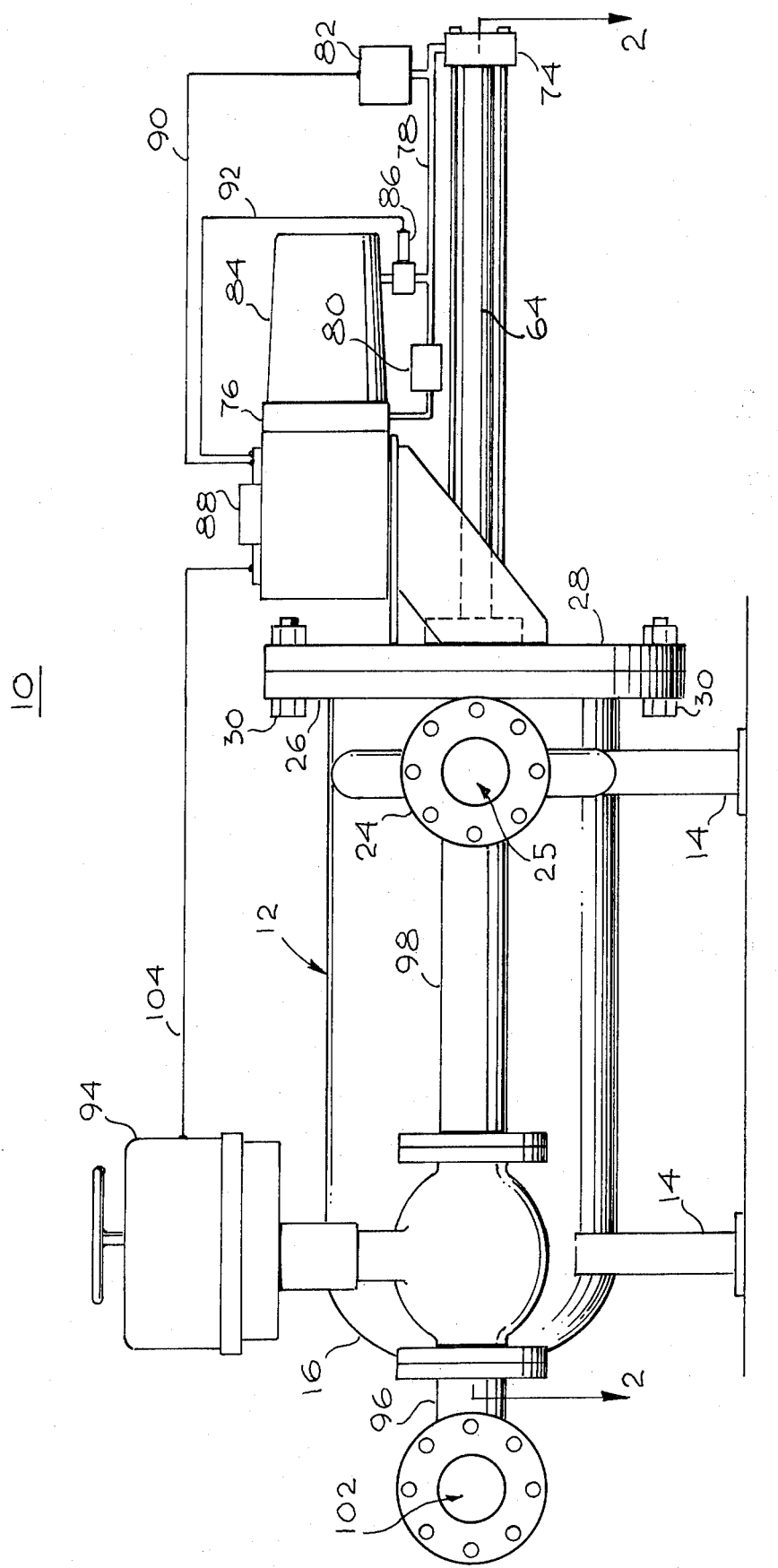
FIG. 1 is a side elevation exterior view of the prover of the present invention.
Figure 2:
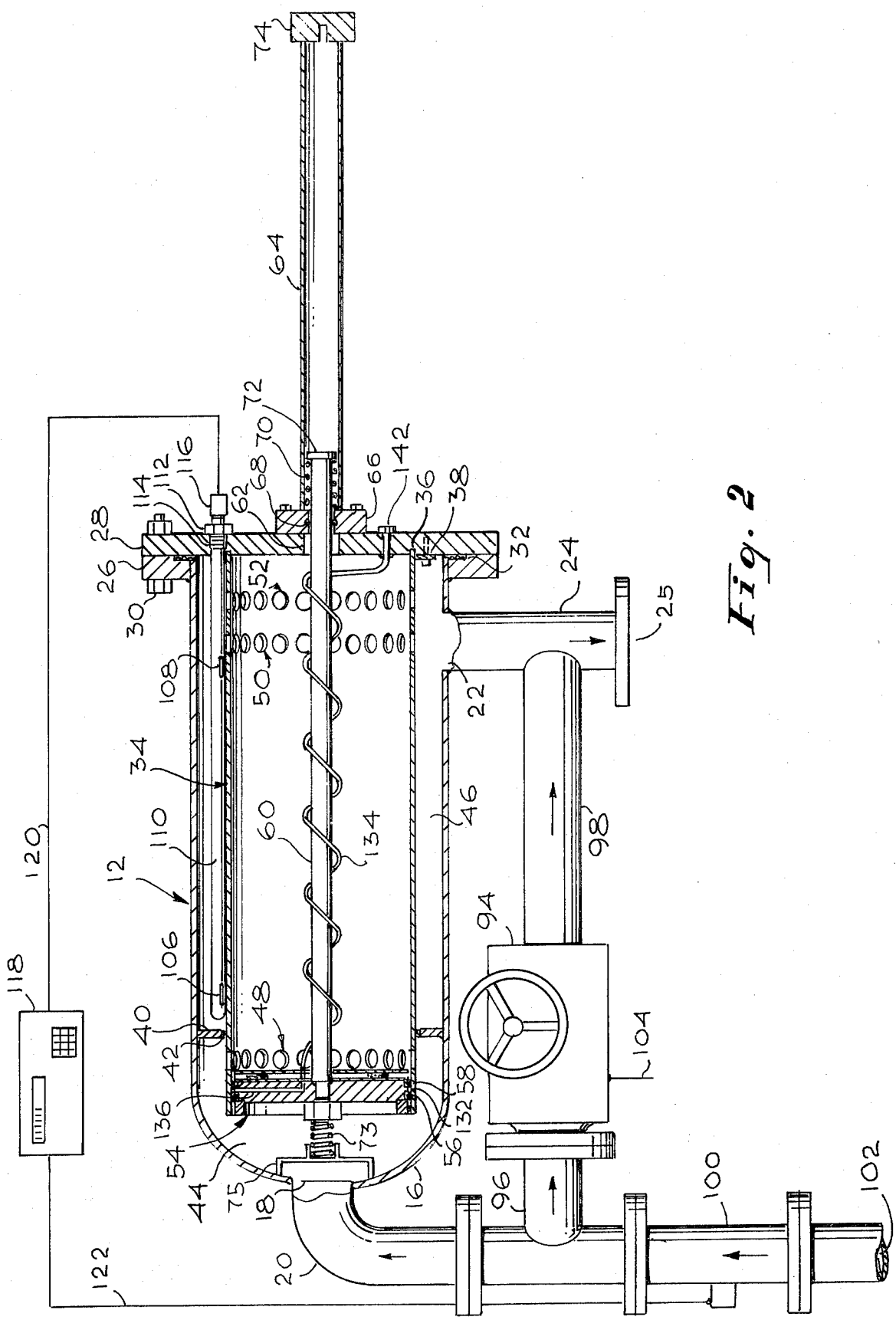
FIG. 2 is a partial cutaway view along section 2—2 of FIG. 1 showing the interior construction of the prover of the present invention.

Referring to FIGS. 1 and 2, there are shown, respectively, a side elevation exterior view and a partial cutaway view of the prover of the present invention. The prover includes a cylindrical outer housing 12 which is supported on a horizontal surface by means of struts 14. One end of the housing 12, defined as the upstream end, is enclosed by a generally hemispherical end cap 16 which is affixed to the housing 12 by means such as welding. The end cap 16 includes a fluid inlet 18 and an inlet pipe 20 affixed thereto. A fluid outlet 22 is provided adjacent the opposite or downstream end of the housing 12, and an outlet pipe 24 is attached thereto, terminating in a fluid outlet 25.

A flange 26, affixed to the downstream end of the housing 12, is in turn fastened to a housing end plate 28 by means of bolts 30. A gasket 32 is provided between the flange 26 and the end plate 28 to provide a liquid seal. Coaxially mounted within the housing 12 is a cylindrical measuring conduit 34 formed of a non-magnetic material and open at both ends. The downstream end of the conduit 34 mates with an annular groove 36 provided within end plate 28. The conduit 34 is fastened in this position by a plurality of clamps 38. This fastening means provides a fluid tight seal between the downstream end of the conduit 34 and the end plate 28.

The conduit 34 is further supported near its upstream end by an annular ring 40 and a flexible seal 42. The annular ring 40 is affixed to the inside wall of the housing 12, and the seal 42 is positioned between the ring 40 and the conduit 34 to provide radial support for the upstream end of the conduit 34. In addition, the combination of the ring 40 and the seal 42 acts to form a fluid barrier which divides the space between the housing 12 and the conduit 34 into an upstream chamber 44 and an annular downstream chamber 46. By supporting the upstream end of the conduit 34 by means of a flexible seal 42, the walls of the conduit 34 are free to expand when subjected to elevated fluid temperatures. Three rows of circular ports are provided in the wall of conduit 34. These are upstream ports 48, downstream ports 50 and deceleration ports 52.

A movable fluid barrier in the form of a piston 54 is slidably mounted within the measuring conduit 34 with piston seals 56 and 58 providing a fluid seal between the piston 54 and the walls of the conduit 34. One end of an actuating rod 60 is centrally fastened to the downstream side of the piston 54. The other, and downstream, end of the actuating rod 60 extends through an opening 62 in the end plate 28. As described below, the volume of fluid displaced by the downstream motion of the piston 54 within a measuring portion of the conduit 34 is used to calibrate the flowmeter 100. The measuring portion of the conduit 34 lies between the upstream and downstream ports 48 and 50, respectively. As can be seen in FIG. 2, none of the supporting means described above for the conduit 34 are located along the measuring portion of the conduit 34. In the operation of the prover 10, this support configuration permits the measuring portion of the conduit 34 by completely surrounded by the measuring fluid.

As shown in FIG. 2, the downstream end of the rod 60 is enclosed within a cylindrical pressure housing 64. One end of pressure housing 64 is fastened to the outside surface of the end plate 28 by means of a flange 66. An O-ring seal 68 is located between the flange 66 and the rod 60 to provide a fluid seal between the measuring conduit 34 and the pressure housing 64. A compression spring 70 is axially mounted on rod 60 and acts between the flange 66 and a shoulder 72 formed at the end of the rod 60. The downstream end of the housing 64 is enclosed by means of an end plate 74. A second compression spring 73 is provided, which is attached at one end to a support bracket 75. The bracket 75 is in turn affixed to the upstream end of the housing 12. The spring 73 acts between the support 75 and the upstream side of the piston 54 when the piston 54 is in the upstream position.

Figure 3:
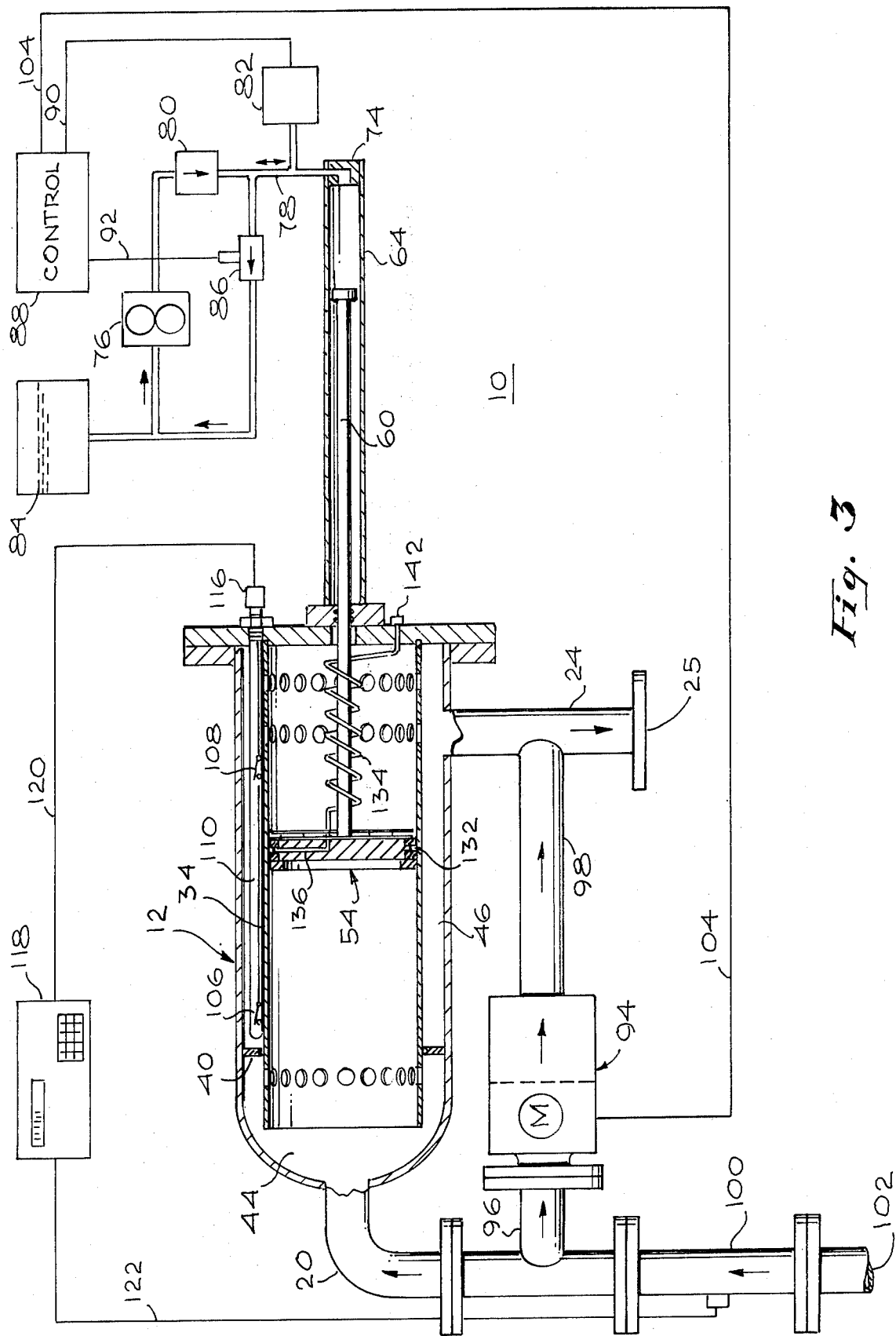
FIG. 3 is a schematic view of the prover of the present invention.

FIG. 3 is a schematic diagram of the prover 10 of the present invention showing the various hydraulic and electrical connections. Referring to FIGS. 1 and 3, the interior of the pressure housing 64 communicates with the outlet of a hydraulic pump 76 via tubing 78 and check valve 80. One end of the tubing 78 and a pressure switch 82 are both connected to the end plate 74 which, via an internal passage, communicates with the interior of the pressure housing 64. An hydraulic reservoir 84 is connected to the inlet of the pump 76. The reservoir 84 also communicates with the interior of the pressure housing 64 via a solenoid operated valve 86. Both the pressure switch 82 and the solenoid valve 86 are electrically connected to a control box 88 via cables 90 and 92, respectively.

As shown in FIGS. 1 and 3, a motor operated bypass valve 94 is connected between the inlet pipe 20 and the outlet pipe 24 by means of T-pipes 96 and 98, respectively. A flow meter 100, which is the meter under test, is mounted to the upstream end of the inlet pipe 20 in series with the prover 10. The arrows shown in FIGS. 1 and 3 indicate the directions of fluid flow in the operation of the prover 10. Fluid enters the system at an inlet 102 upstream of the flow meter 100. With bypass valve 94 in the closed position, the fluid passes through the flow meter 100 and enters the housing 12 by means of inlet pipe 20. As described below, the fluid will exit the housing 12 via the outlet pipe 24. When the bypass valve 94 is in the open position, the fluid flows from the inlet 102 through the flow meter 100, through the bypass 94 via the T's 96 and 98, exiting from the outlet pipe 24 and bypassing the prover housing 12. The bypass valve 94 is electrically connected to the control box 88 by means of a cable 104.

The bypass valve 94 is of the double-block-and-bleed type, well known in the art. This type of valve, such as Model No. 6150-31-2236-TT-DBB manufactured by Jamesbury Corporation, Worcester, Mass., employs a valve seal on each side of an intervening cavity. A port is provided in the body of the valve which communicates with this intervening cavity. By continuously monitoring the pressure in the cavity via the port, one can detect the presence of leakage past either valve seal. As described below, this feature of the valve 94 is employed to continuously monitor the integrity of the seals within the valve 94 while the prover is functioning. The valve 94 may be electrically operated by employing a motorized actuator such as Model No. ERC250, also manufactured by Jamesbury Corporation.

The position of the piston 54 within the conduit 34 is sensed by means of two magnetically operated reed switches 106 and 108. As shown in FIGS. 2 and 3, the reed switches 106 and 108 are located adjacent the outside surface of the measuring conduit 34 within the downstream annular chamber 46. The switches 106 and 108 are enclosed within a fluid tight tube 110 having a threaded flange 112 fastened to one end thereof. The tube 110 is fastened in place by threading the flange 112 into a threaded hole 114 located in the end plate 28 as shown in FIG. 2. Electrical connection to the switches 106 and 108 is facilitated by means of a junction box 116 located exterior to the flange 112. The switches 106 and 108 are electrically connected to a prover counter 118 by means of a cable 120, and the flow meter 100 under test is also electrically connected to the prover counter 118 by means of a cable 122.

Figure 4:
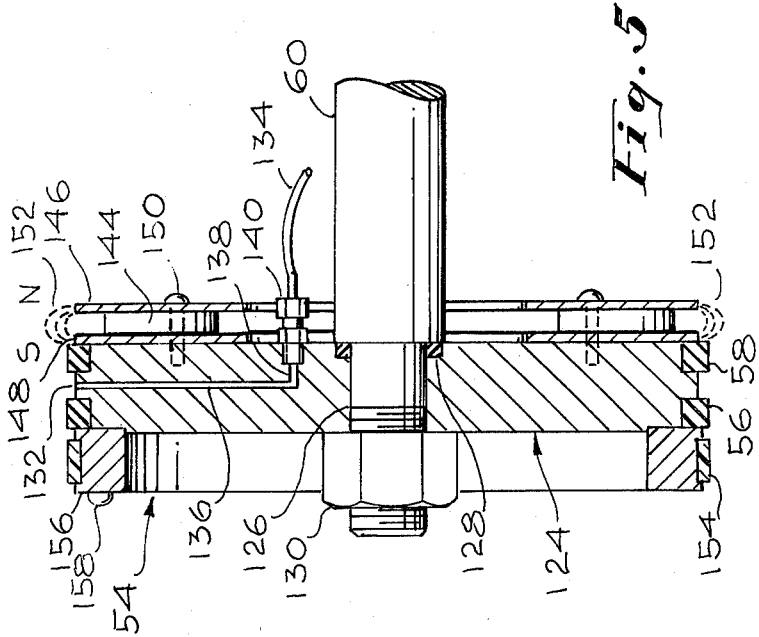
FIG. 4 is a detail view of the piston assembly portion of the prover of the present invention.
Figure 5:
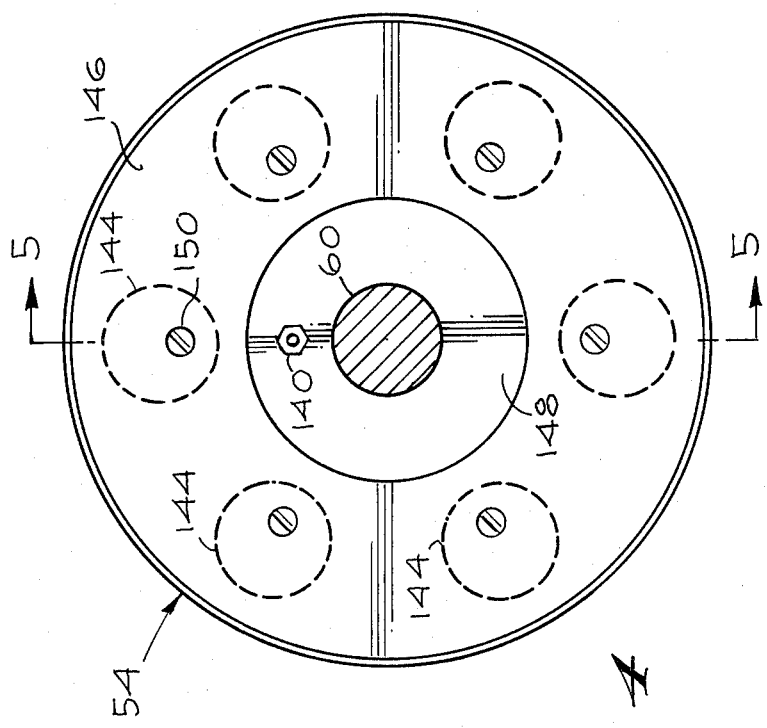
FIG. 5 is a partial cutaway view along section 5—5 of FIG. 4 showing the construction of the piston assembly.

Referring now to FIGS. 4 and 5, there are shown detailed views of the piston assembly 54. FIG. 4 is a view of the downstream face of the piston 54, and FIG. 5 is a partial cutaway view of the piston 54 along section 5—5 of FIG. 4. The body of the piston 54 includes a cylindrical disk 124 formed of steel or other suitable material. A clearance hole 126 is provided in the center of the disk 124 to receive the threaded end of the actuating rod 60. A seal 128 is also provided to prevent leakage through the opening 126. The rod 60 is fastened to the downstream side of the disk 124 by a nut 130. Recesses are provided around the circumference of the disk 124 to reatain the piston seals 56 and 58. The seals 56 and 58 are arranged to form a small annular cavity 132 around the periphery of the disk 124 between the seals 56 and 58.

As shown in FIG. 5, the annular cavity 132 communicates with one end of a flexible tube 134 by means of a radially disposed passage 136 and an intersecting axially disposed passage 138 within the disk 124. A fitting 140 is provided to connect the flexible tube 134 to the passage 138. As shown in FIGS. 2 and 3, the flexible tube 134 is loosely wrapped along the length of the actuating rod 60, terminating in a fitting 142 which projects through the end plate 28. During the operation of the prover 10 fluid leakage past either of the seals 56 or 58 will result in fluid flow through the tubing 134. By continuously monitoring the pressure in the tube 134 via the fitting 142 the integrity of the piston seals 56 and 58 may be continuously monitored during a prover test.

The piston 54 also includes means for providing a magnetic field necessary to actuate the position-detecting reed switches 106 and 108 described above. As shown in FIGS. 4 and 5, a plurality of magnets 144, preferably in the form of ceramic disks, are equally spaced around the circumference of, and on the downstream side of, the disk 124. The magnets 144 are in turn sandwiched between two magnetic pole pieces 146 and 148 in the form of thin annular disks of soft steel. The magnets 144 are held in place by means of screws 150. This arrangement of the magnets 144, which are preferably magnetized axially, causes a magnet field 152 to be formed around the entire perimeter of the pole pieces 146 and 148. While six magnets are shown in FIG. 4 any number arranged to produce a reasonably uniform magnetic field at the perimeter of the pole pieces 146 and 148 will function equally well. As shown in FIG. 5, a wearing ring 154 is also included as part of the piston 54. The wearing ring 154 is supported by an annular support ring 156 which is in turn fastened to the upstream side of the disk 124 by means such as screws 158. The support ring 156 also serves as a retainer for the piston seal 56; and, in like manner the pole piece 148 serves as a retainer for the piston seal 58.

Figure 6:
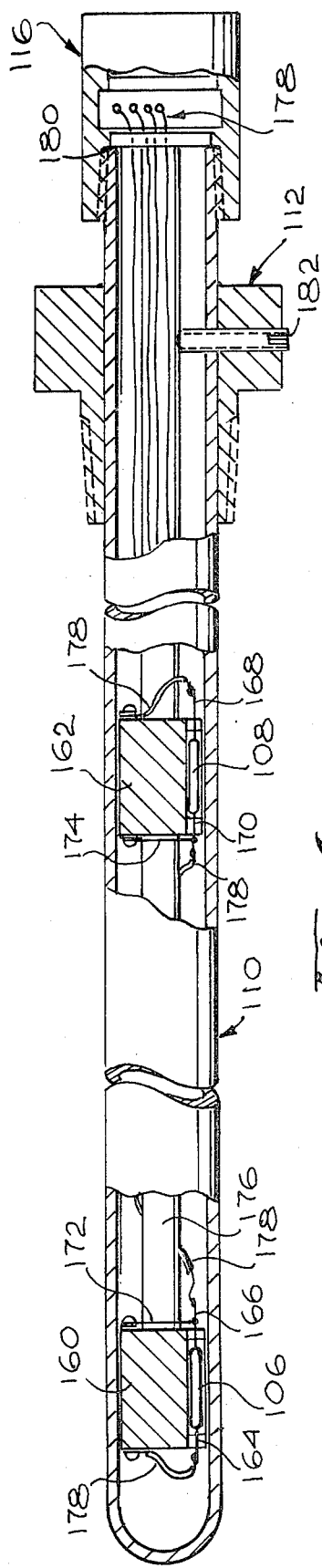
FIG. 6 is a partial cutaway view of the detector switch assembly portion of the prover of the present invention.

Referring now to FIG. 6, there is shown a partial cutaway view illustrating the details of the detector switch assembly of the prover 10 of the present invention. The detector switch assembly includes the cylindrical tube 110 which is formed of a non-magnetic material and which has a closed end. The magnetically operated reed switches 106 and 108 are enclosed in glass capsules and have leads axially extending therefrom. Such glass encapsulated reed switches are well known in the art. These switches 106 and 108 are slidably mounted in recesses formed in supporting blocks 160 and 162, respectively. The leads 164 and 166 of switch 106 and the leads 168 and 170 of switch 108 project through clearance holes provided in the support blocks 160 and 162 respectively. Bimetallic elements 172 and 174, preferably in the form of elongated strips, are mounted so that one end of the elements 172 and 174 is fastened to one side of the support blocks 160 and 162, respectively. The elements 172 and 174 are mounted in such a way that their unfastened ends are free to move along an axis parallel to the axis of the tube 110.

Lead 166 of switch 106 is rigidly attached to the free end of the bimetallic element 172 by use of high temperature epoxy or other suitable means. Similarly, lead 170 of switch 108 is rigidly attached to the free end of bimetallic element 174. The support blocks 160 and 162 are in turn rigidly mounted to a spacer bar 176 which extends along the length of the tube 110. Spacer bar 176 serves to hold the blocks 160 and 162 in a fixed spaced apart relationship. Electrical connections are made to the switches 106 and 108 by means of thin flexible wires 178 which are attached to leads 164, 166, 168 and 170 by means such as soldering. The wires 178 are routed along the length of the spacer bar 176 terminating at the open end of the tube 110 supporting the threaded flange 112.

As shown in FIG. 6, the assembly including the spacer bar 176 and the support blocks 160 and 162 is inserted within the interior of the tube 110. The tube 110 is in turn inserted within the annular cavity 46 of the prover 10 and fastened in place by threading the flange 112 into the threaded hole 114 in the end plate 28, as shown in FIG. 2. When tube 110 is in place and prior to the installation of the junction box 116, the spacer arm 176 is oriented by rotating the exposed end 180 of bar 176. Spacer bar 176 is rotated so that the reed switches 106 and 108 are adjacent the wall of the measuring conduit 34. Spacer bar 176 is then locked into this position by tightening a set screw 182 as shown in FIG. 6. This orientation of spacer bar 176 assures maximum magnetic coupling between the magnetically operated reed switches 106 and 108 and the magnetic field 152 of the piston 54. After proper orientation of spacer bar 176, junction box 116 is threaded onto the exposed end of tube 110 and connections are made between the free ends of the conductors 178 and the cable 120 as shown in FIGS. 2 and 3.

As described below, the detector switch assembly is entirely immersed in the measured fluid during a prover test. Accordingly, the temperature of the bimetallic elements 172 and 174 will correspond at all times to the temperature of the measured fluid. As the fluid temperature increases, the bimetallic elements 172 and 174 deflect in a direction which brings the two reed switches 106 and 108 closer together. This axial motion of the switches 106 and 108 exactly compensates for the increased dimensions of the measuring conduit 34 due to elevated fluid temperature. Thus, the volume of fluid displaced by the piston 54 between the two switches 106 and 108 remains constant regardless of temperature. This action provides automatic temperature compensation for the prover 10 without the need for calculations by the operator.

The operating sequence of the prover 10 is as follows: In the normal or rest position, the piston 54 is at the downstream end of its stroke adjacent the end plate 28; and the electrically operated bypass valve 94 is in the open position. Referring to FIGS. 2 and 3, it can be seen that the fluid will flow through the inlet 102, the flow meter 100 and the bypass valve 94 and exit from the outlet 25. A small amount of the fluid will also pass through the interior of the prover 10 in a manner described below.

A prover run is initiated by starting the hydraulic pump 76 with the solenoid operated valve 86 in a closed position. Pressurized hydraulic fluid from the reservoir 84 enters the pressure housing 64 via the tube 78. This hydraulic pressure exerts a force against the actuating rod 60 forcing it, together with the piston 54, to move upstream within the conduit 34. At the completion of its upstream stroke, actuating rod 60 compresses the springs 70 and 73; and the actuating rod 60 and the piston 54 are brought to a smooth stop when the springs 70 and 73 are fully compressed. This action avoids any abrupt changes in stopping the motion of the piston 54, reducing fluid perturbation in the system. When the piston 54 stops moving, the hydraulic pressure within the housing 64 increases, actuating the pressure switch 82 which indicates full upstream travel of the piston. Closure of the pressure switch 82 is communicated to the control box 88 via the cable 90, and relay logic within the control box 88 initiates the closing of the bypass valve 94. When the bypass valve 94 is fully closed flow ceases in the pipes 96 and 98 causing the entire fluid stream to pass through the inlet pipe 20 and into the upstream prover chamber 44. The ring 40 and the seal 42 prevent fluid from directly entering the downstream chamber 46. The fluid is thus caused to enter the conduit 34 via the upstream ports 48 filling the interior of the conduit 34. The fluid then exits the conduit via the downstream ports 50 and the deceleration ports 52, fills the downstream annular cavity 46, and exits the housing 12 via the pipe 24 and the outlet 25.

After a sufficient time interval has passed to allow the bypass 94 to fully close and to allow the fluid stream sufficient time to establish equilibrium in the system, the hydraulic pump 76 is stopped and the valve 86 is opened. These actions cause the release of hydraulic pressure in pressure housing 64 and allow hydraulic fluid to return through valve 86 to the reservoir 84. Piston 54 will now begin moving in a downstream direction due both to the force of the moving fluid and to the forces exerted by the springs 70 and 73. As the piston 54 moves downstream, it will first cover the upstream ports 48. This prevents bypass flow around the piston 54 and causes it to move in full synchronism with the fluid flow. It has been found that the spring 73 is required when the measured flow is at low line pressure, to assist the initial downstream motion of the piston 54 until the upstream ports 43 are covered.

The placement of the actuating rod 60 on the downstream side of the piston 54 reduces the effective downstream surface area of the piston 54. This effect creates a net force on piston 54 which aides its downstream motion. Thus the piston 54 overcomes the friction of the seals 56 and 58 while maintaining equal fluid pressure on both sides of piston 54.

As the piston 54 passes the magnetically operated reed switch 106, the magnetic field 152 formed by the magnets 144 and the pole pieces 146 and 148 of the piston 54 extends through the nonmagnetic walls of the conduits 34 and the tube 110 to actuate the switch 106. The relatively close spacing of the pole pieces 146 and 148, as shown in FIG. 5, causes the magnetic field 152 to be concentrated in a limited area with a sharp gradient. This condition ensures closure of the reed switches 106 and 108 at the same point on the piston 54 travel for each proving stroke.

The closure of the switch 106 provides a start signal to the prover counter 118 via the cable 120. Near the end of its stroke, piston 54 actuates the detector switch 108 in the same manner described above for the switch 106. The closure of the switch 108 sends a second signal to the prover counter 118. The piston 54 continues downstream past the ports 50. When the piston 54 finally covers the deceleration ports 52, the piston 54 is smoothly decelerated to a stop by the fluid which is trapped between the downstream side of the piston 54 and the end plate 28. This fluid thus acts as a hydraulic shock absorber preventing the piston 54 from a hard impact upon stopping. The closure of the detector switch 108 may also be used to initiate opening of the bypass valve 94 thus returning the system to its original condition.

During the entire prover run, the integrity of the piston seals 56 and 58 may be continuously monitored by observing the pressure within the tube 134 as described above. In a similar manner, the integrity of the seals in the double-block-and-bleed bypass valve 94 may also be monitored during the test. The action of the bimetallic elements 172 and 174 provide automatic temperature compensation of the prover 10 during the prover test.

During the prover run, the flow meter 100 under test reproduces a series of electrical impulses, each impulse representing a certain volume of fluid. These flow meter impulses are communicated to the prover counter 118 via the cable 122. Following a proving test, a figure defining the number of meter impulses per unit of fluid volume is determined by dividing the number of flow meter impulses produced during the proving test by the prover volume. This figure is known as a calibration factor or K factor and is expressed in terms of impulses per unit volume. In the prover of the present invention, a pulse interpolation technique is utilized within the prover counter 118 which permits resolving the number of flow meter impulses to a fraction of a single impulse. Such interpolation techniques can provide a resolution of one part in ten thousand or better.

The pulse interpolation technique employed in the present invention involves the measurement of two time intervals. The first interval $T_o$ is the interval of time between the closures of the two detecting switches 106 and 108. The second interval, T is the difference in time between the first flow meter 100 impulse occuring after closure of the first detector switch 106 and the time of occurrance of the first flow meter impulse after the closure of the second detector switch 108. The exact fractional number of impulses $P_o$ occurring during the time T is obtained by multiplying the whole number of counted impulses P by the ratio of $T_o$ to T:

$$P_o = (T_o/T) \times P$$

The above computation is performed by a microprocessor within the prover counter 118. The result is displayed on a lighted numerical display. The actual calibration factor K may also be computed by the microprocessor and is obtained by dividing the number of impulses $P_o$ by the prover volume $Q_p$:

$$K = P_o/Q_p$$

The rate of flow q, is obtained by dividing the prover volume $Q_p$ by the time interval $T_o$:

$$q = Q_p/T_o$$

Other measurement techniques, such as using a phase lock loop to multiply the flow meter impulse frequency, may be employed to achieve similar high resolution in the counting of the flow meter impulses.

Figure 7:
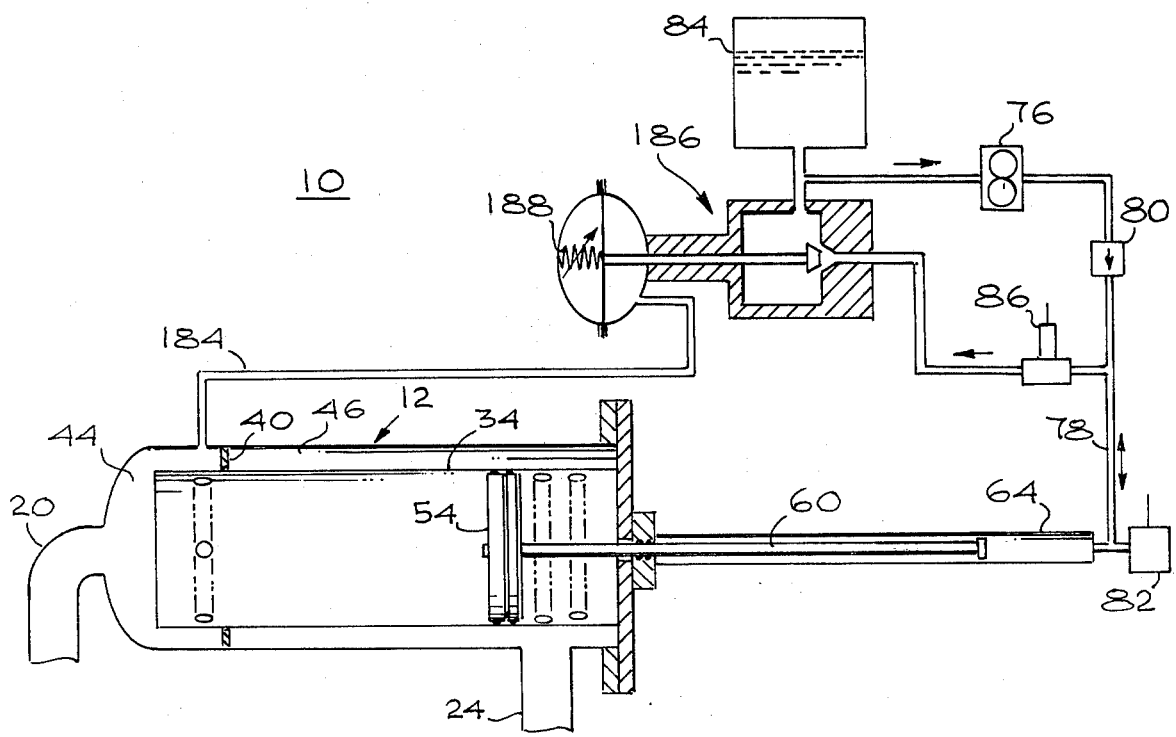
FIG. 7 is a schematic view of a pressure control system which may be used with the prover of the present invention.

Under certain operating conditions, it may be desirable to regulate the level of fluid pressure on the upstream side of the piston 54. Such conditions occur, for example, when the measured fluid is compressible as in the case of a gas or a light liquid. A pressure control system for performing this function is shown schematically in FIG. 7. A pipe 184 is provided in which one end communicates with the upstream chamber 44 of the prover 10 through the wall of the housing 12. The other end of the pipe 184 is connected to a conventional mechanically operated pressure regulator 186. Regulators of this type are well known in the art and include a spring loaded diaphragm or a bellows to actuate a poppet which in turn regulates the flow through the regulator. The desired pressure level to be regulated is set by means of an adjustable spring 188 within the regulator 186. As shown in FIG. 7, the regulator 186 controls the flow between the solenoid operated valve 86 and the hydraulic reservoir 84.

Operation of the pressure control system of FIG. 7 is as follows: During the measuring stroke of the piston 54, hydraulic fluid inside the pressure housing 64 is displaced by the downstream motion of the actuating rod 60 causing fluid in the housing 64 to flow outward through pipe 78, through the open valve 86, through the regulator 186, and into the reservoir 84. The pressure level on the upstream side of the piston 54 is communicated to the pressure regulator 186 via the pipe 184. If the pressure in the pipe 184 is higher than the pressure level set by the spring 188, the poppet within the regulator 186 will move in an opening direction to permit a higher flow of hydraulic fluid out of the housing 64. This action reduces the back pressure on the actuating rod 60 thereby allowing freer motion of piston 54 and resulting in lowering of the upstream pressure on the piston 54. Conversely, if the pressure in the pipe 184 is less than the pressure setting of the spring 188, this will result in a partial closing of the regulator 186, restricting the flow of hydraulic fluid and thereby increasing the upstream pressure on the piston 54.

Figure 8:
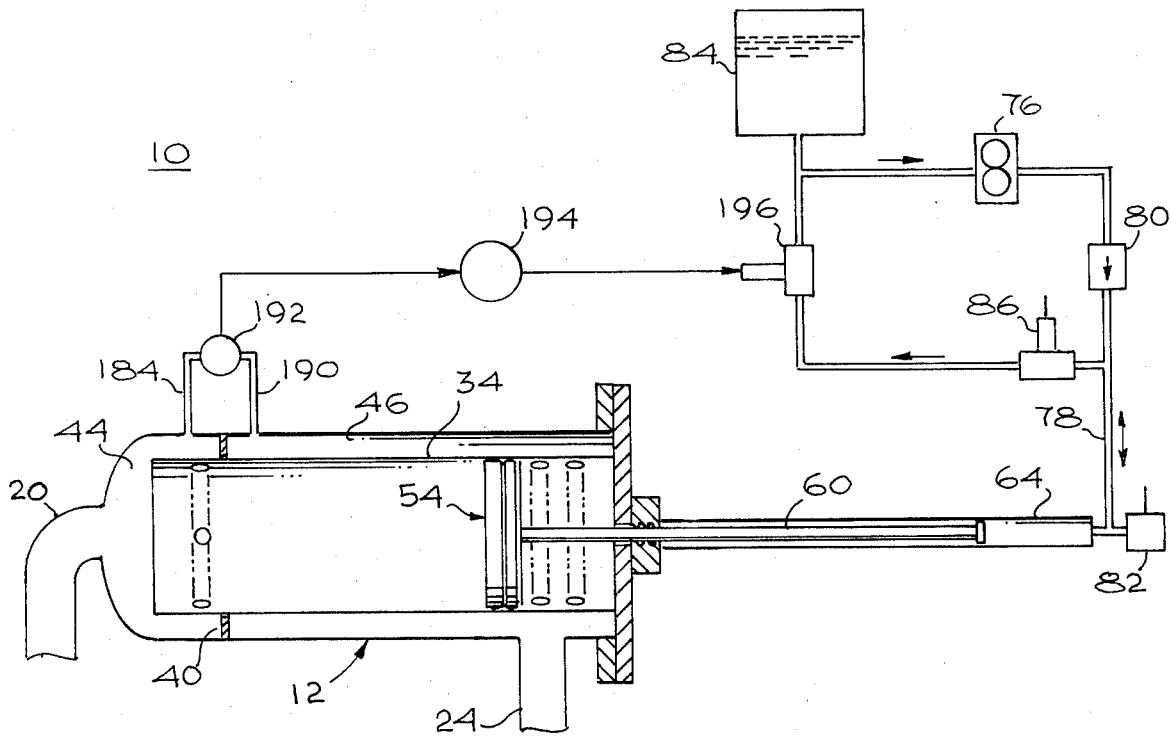
FIG. 8 is a schematic view of another embodiment of a pressure control system which may be used with the prover of the present invention.

An alternate embodiment of the pressure regulating system described above is shown in FIG. 8. This system may be used to maintain a constant pressure drop across the upstream and downstream sides of the piston 54. As shown in FIG. 8, pipes 184 and 190 are provided which communicate, respectively, with the upstream chamber 44 and the downstream annular chamber 46 of the prover 10. The pipes 184 and 190 are in turn connected to a conventional differential pressure transducer 192. The differential pressure transducer 192 senses the difference in pressure in the pipes 184 and 190 corresponding to the difference in pressure across the upstream and downstream sides of the piston 54. The differential pressure transducer 192 provides an output signal which is proportional to this pressure differential. The output signal of the transducer 192 is in turn used to control a differential pressure controller 194. Controller 194 functions to compare the output signal from the transducer 192 with an internally set value. Any deviation between these two levels will cause an output of the controller 194 which is used to operate a control valve 196. Control valve 196 is used to regulate the flow between the solenoid valve 86 and the hydraulic reservoir 84 in a manner similar to the function of the regulator 186 shown in FIG. 7 and described above.

During a proving run, the pressure control system shown in FIG. 8 will regulate the flow of the hydraulic fluid from the pressure housing 64 to maintain a constant pressure drop across the piston 54. As will be understood by those skilled in the art, a system similar to that shown in FIG. 8 may be employed to regulate the upstream pressure on the piston 54 in place of the mechanical pressure regulator 186 of FIG. 7. Alternatively, a differential version of the pressure regulator 186 may be employed in the system of FIG. 8 to regulate the pressure drop across the piston 54. Further, systems similar to those shown in FIGS. 7 and 8 may also be employed to regulate the downstream pressure on the piston 54.

While the invention is thus disclosed and the presently preferred embodiment described in detail, it is not intended that the invention be limited to the shown embodiment. Instead, many modifications will occur to those skilled in the art which lie within the spirit and scope of the invention. It is accordingly intended that the invention be limited only by the appended claims.

What is claimed is:

1. Apparatus for measuring a quantity of a flowing fluid, comprising:
   an outer fluid housing having upstream and downstream ends, an inlet communicating with the upstream end and an outlet communicating with the downstream end;
   a measuring conduit;
   means for coaxially mounting the conduit within the outer housing, forming an annular cavity between the conduit and the housing;
   a fluid barrier;
   means for mounting the barrier within the annular cavity in a manner which divides the cavity into upstream and downstream sections;
   a controllable piston slidably mounted within the conduit and having upstream and downstream sides;
   an actuating rod axially projecting from the downstream side of the piston, where the free end of the rod extends through the downstream end of the outer housing;
   first fluid bypass means connected between the inlet and outlet of the outer housing whereby the fluid can bypass the outer housing when the bypass is open;
   first and second piston detection means;
   means for positioning the first and second detection means in a spaced apart relationship where the distance between the first and the second detection means corresponds to the length of the fluid measuring portion of the conduit; and
   second fluid bypass means including a first set of apertures provided in the conduit adjacent the upstream end thereof, and a second set of apertures provided in the conduit adjacent the downstream end thereof, whereby the fluid can bypass the piston when the piston is located at either the upstream or downstream limits of its travel within the conduit, and where the measuring portion of the conduit lies between the first and second sets of apertures; and where the means for coaxially mounting the conduit within the outer housing are located at positions of the conduit which exclude the fluid measuring portion of the conduit, so that the entire inner and outer surface of the fluid measuring portion of the conduit may be exposed to the fluid.

2. The apparatus of claim 1 in which the means for coaxially mounting the conduit include fastening the downstream end of the conduit to the downstream end of the outer housing.

3. The apparatus of claim 2 which further includes a third set of apertures provided in the conduit downstream of the second set of apertures, whereby when the piston covers the third set of apertures the fluid within the conduit smoothly decelerates the piston motion.

4. The apparatus of claim 2 in which the means for mounting the conduit includes the fluid barrier, and where the means for mounting the fluid barrier includes affixing one end of the barrier to the inside surface of the outer housing upstream of the first set of apertures, and sealably engaging the other end of the barrier to the outer surface of the conduit in a manner which permits the free expansion of the conduit in response to fluid temperature.

5. Apparatus for measuring a quantity of a flowing fluid, comprising:
   an outer fluid housing having upstream and downstream ends, an inlet communicating with the upstream end and an outlet communicating with the downstream end;
   a measuring conduit;
   means for coaxially mounting the conduit within the outer housing, forming an annular cavity between the conduit and the housing;
   a fluid barrier;
   means for mounting the barrier within the annular cavity in a manner which divides the cavity into upstream and downstream sections;
   a controllable piston slidably mounted within the conduit and having upstream and downstream sides;
   actuating rod axially projecting from the downstream side of the piston, where the free end of the rod extends through the downstream end of the outer housing;
   first fluid bypass means connected between the inlet and outlet of the outer housing whereby the fluid can bypass the outer housing when the bypass is open;

first and second piston detection means;

means for positioning the first and second detection means in a spaced apart relationship where the distance between the first and the second detection means corresponds to the length of the fluid measuring portion of the conduit; and second fluid bypass means including a first set of apertures provided in the conduit adjacent the upstream end thereof, and a second set of apertures provided in the conduit adjacent the downstream end thereof, whereby the fluid can bypass the piston when the piston is located at either the upstream or downstream limits of its travel within the conduit, and where the measuring portion of the conduit lies between the first and second sets of apertures, and where the means for positioning the first and second piston detection means includes means responsive to the temperature of the fluid for altering the spaced apart relationship between the detection means so that the fluid measuring portion of the conduit represents a constant displaced volume regardless of fluid temperature.

6. The apparatus of claim 5 in which the piston detection means includes electrical switches, and the means for positioning the detection means further includes mounting the electrical switches along the length of and adjacent the outside surface of the conduit and within the annular cavity between the conduit and the housing.

7. The apparatus of claim 6 in which the means responsive to the temperature of the fluid includes bimetal temperature sensitive elements to which the electrical switches are fastened, and which elements move the switches in response to fluid temperature in a manner which decreases the spacing between the switches as a function of increases in fluid temperature.

8. Apparatus for measuring a quantity of a flowing fluid, comprising:

an outer fluid housing having upstream and downstream ends, an inlet communicating with the upstream end and an outlet communicating with the downstream end;

a measuring conduit;

means for coaxially mounting the conduit within the outer housing, forming an annular cavity between the conduit and the housing;

a fluid barrier;

means for mounting the barrier within the annular cavity in a manner which divides the cavity into upstream and downstream sections;

a controllable piston slidably mounted within the conduit and having upstream and downstream sides;

an actuating rod axially projecting from the downstream side of the piston, where the free end of the rod extends through the downstream end of the outer housing;

first fluid bypass means connected between the inlet and outlet of the outer housing whereby the fluid can bypass the outer housing when the bypass is open;

first and second piston detection means;

means for positioning the first and second detection means in a spaced apart relationship where the distance between the first and the second detection means corresponds to the length of the fluid measuring portion of the conduit; and second fluid bypass means including a first set of apertures provided in the conduit adjacent the upstream end thereof, and a second set of apertures provided in the conduit adjacent the downstream end thereof, whereby the fluid can bypass the piston when the piston is located at either the upstream or downstream limits of its travel within the conduit, and where the measuring portion of the conduit lies between the first and second sets of apertures, and which further includes means for applying an upstream directed force to the free end of the actuating rod to move the piston from the downstream end to the upstream end of the conduit, and to restrain the downstream motion of the piston.

9. The apparatus of claim 8 in which the means for applying a force to the free end of the actuating rod includes a pressure housing surrounding a portion of the actuating rod external to the outer fluid housing and means for applying a control fluid under pressure to the interior of the pressure housing.

10. The apparatus of claim 9 in which the downstream motion of the piston may be controlled by regulating the flow of control fluid from the pressure housing.

11. The apparatus of claim 10 in which the flow of control fluid from the pressure housing is regulated in response to the flowing fluid pressure on the upstream side of the piston so that increasing flowing fluid pressure causes an increase in the flow of control fluid.

12. The apparatus of claim 10 in which the flow of control fluid from the pressure housing is regulated in response to the differential pressure of the flowing fluid between the upstream and downstream sides of the piston so that an increase in the differential pressure causes an increase in the flow of the control fluid.

13. Apparatus for measuring a quaantity of a flowing fluid, comprising:

an outer fluid housing having upstream and downstream ends, an inlet communicating with the upstream end and an outlet communicating with the downstream end;

a measuring conduit;

means for coaxially mounting the conduit within the outer housing, forming an annular cavity between the conduit and the housing;

a fluid barrier;

means for mounting the barrier within the annular cavity in a manner which divides the cavity into upstream and downstream sections;

a controllable piston slidably mounted within the conduit and having upstream and downstream sides;

an actuating rod axially projecting from the downstream side of the piston, where the free end of the rod extends through the downstream end of the outer housing;

first fluid bypass means connected between the inlet and outlet of the outer housing whereby the fluid can bypass the outer housing when the bypass is open;

first and second piston detection means;

means for positioning the first and second detection means in a spaced apart relationship where the distance between the first and the second detection means corresponds to the length of the fluid measuring portion of the conduit; and second fluid bypass means including a first set of apertures provided in the conduit adjacent the upstream end thereof, and a second set of apertures provided in the conduit adjacent the downstream end thereof, whereby the fluid can bypass the piston when the piston is located at either the upstream or downstream limits of its travel within the conduit, and where the measuring portion of the conduit lies between the first and second sets of apertures; and in which the piston includes two spaced apart seals each encircling the perimeter of the piston, an annular cavity formed between the seals, a passage connecting the cavity to one end of a flexible tube, and means for connecting the other end of the flexible tube to the exterior of the outer housing, whereby the integrity of the piston seals may be continuously monitored from the output of the flexible tube while the piston is stationary or in motion.

14. A method for determining the calibration factor of a flowmeter comprising the steps of:
providing an outer fluid housing having an inlet and an outlet,
providing a measuring conduit coaxially mounted within the outer housing and having first and second sets of fluid apertures adjacent, respectively, the upstream and downstream ends thereof,
providing a fluid barrier mounted within the annular cavity between the outer housing and the conduit,
providing a controllable piston mounted within the conduit,
providing an actuating rod axially projecting from the downstream side of the piston where the free end of the rod extends through the downstream end of the outer housing,
providing a bypass valve connected between the inlet and outlet of the outer housing,
providing first and second piston detection points positioned in a spaced apart relationship;
connecting the flowmeter in series within the outer fluid housing;
opening the bypass valve;
applying an upstream directed force to the free end of the actuating rod, causing the piston to move to, and remain at the upstream end of the conduit;
closing the bypass valve;
waiting an interval of time until the bypass valve is completely seated and fluid flow has achieved a steady state condition;
releasing the force from the free end of the actuating rod, allowing the piston to move downstream in synchronism with fluid flow;
measuring a time interval for the piston to travel the distance between the first and second piston detection points; and
comparing the response of the flowmeter during the time interval with the volume of the conduit defined by the distance between the first and second detection points, so as to determine the calibration factor of the flowmeter.

15. In apparatus for measuring a quantity of a flowing fluid by means of a fluid barrier moving in a conduit and displacing a known volume of fluid, and having first and second barrier detection means spaced apart along the conduit so that the distance between the first and second detection means defines the known volume of fluid, the improvement comprising:
means for automatically altering the spacing between the first and second detection means in response to the temperature of the fluid to correct for the conduit dimensional changes due to fluid temperature, so that the distance between the detection means represents a constant displaced volume regardless of fluid temperature.

16. In apparatus for measuring a quantity of a flowing fluid by means of a piston moving in a conduit and displacing a known volume of fluid, the improvement comprising:
the piston including two seals each encircling the perimeter of the piston, an annular cavity formed between the seals, a passage connecting the cavity to one end of a flexible tube, and means for connecting the other end of the flexible tube to the exterior of the apparatus, whereby the integrity of the piston seals may be continuously monitored from the output of the flexible tube while the piston is stationary or in motion.

* * * * *